F. N. MACKAY.
Water-Agitator for Ice Apparatus.
No. 214,425.  Patented April 15, 1879.
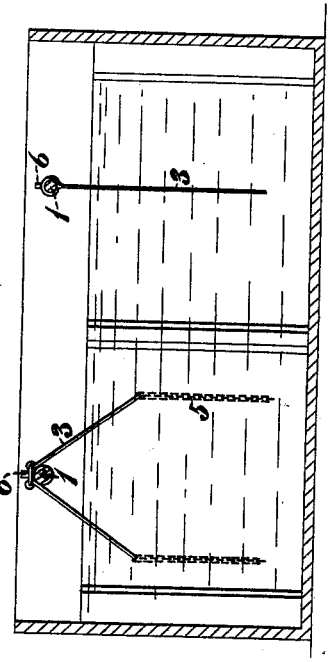
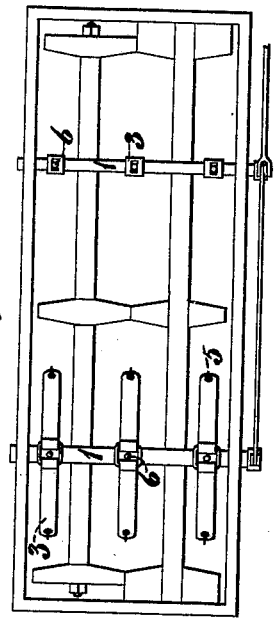
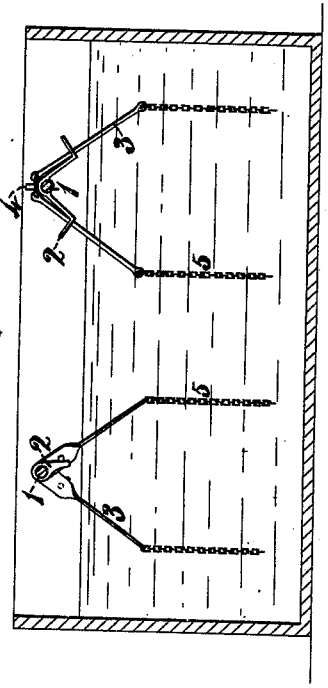
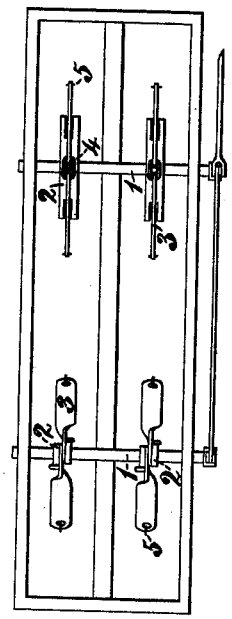
Witnesses
M. B. Johnson
Wm. Edwards
Inventor
Fred. N. Mackay

UNITED STATES PATENT OFFICE.

FREDERICK N. MACKAY, OF LIVERPOOL, ENGLAND.

IMPROVEMENT IN WATER-AGITATORS FOR ICE APPARATUS.

Specification forming part of Letters Patent No. 214,425, dated April 15, 1879; application filed August 17, 1878.

*To all whom it may concern:*

Be it known that I, FREDERICK NOEL MACKAY, of Liverpool, in the county of Lancaster, England, have invented a new and useful Improvement in Agitators to be Used in the Manufacture of Ice, of which the following is a specification.

This invention relates to agitators to be used with apparatus or appliances in which water in a tank is frozen into ice on the sides of cells through which a cooling-fluid is caused to circulate.

In order that the water between the cells may be frozen into clear blocks of ice, free from air-bubbles, it is necessary that the said water should be agitated as long as possible during the process of freezing; and the object of my invention is to provide apparatus or appliances which shall efficiently agitate the water to be frozen, and which shall allow of the agitation being continued until the water between the cells is nearly all frozen into ice. For this purpose I employ vibrating arms, so attached or fitted to a rocking shaft that the said arms shall be lifted through the water to be frozen by the action of the rocking shaft, but shall enter the water again by the action of gravity or a spring. In this way the agitation may be continued until the water between the cells is nearly all frozen, because, as soon as the space between the blocks of ice on the cells becomes too small to allow of the passage of the agitating-arms between them, the said arms will remain on the top of the ice when lifted by the rocking shaft, and will not be damaged, as would be the case if they were fixed rigidly to the said rocking shaft. Moreover, it is not necessary for the attendant to watch the freezing of the water, so as to be enabled to remove the agitators before the space between the slabs or blocks of ice becomes too small to allow of the free passage of the agitating-arms.

Figures 1 and 2 are plan views, and Figs. 3 and 4 sectional elevations, of ice tanks and cells, in which four modifications of my improved agitators are shown.

In Figs. 1 and 3, 1 is a rocking shaft having affixed thereto yokes or saddles 2. 3 are the agitating-arms, which rest on the yokes or saddles 2, and are maintained in position by the pins 4 on the shaft 1. To the ends of the arms are attached chains 5, which assist in agitating the water.

In Figs. 2 and 4 the yokes or saddles are not employed.

The arms 3 receive their motion from the pins 6, secured on the rocking shaft 1.

It will be obvious that agitators may be made in a great number of ways under my invention, the essential feature of which is so constructing an agitator that the agitating-arms receive a positive motion to lift them out of the water, but are allowed to re-enter such water by the action of gravity or a spring.

It will be noticed that the several devices employed to actuate the agitators are in effect tappet devices.

I am aware that agitators so attached to the rock-shaft as to have a positive motion in two directions, or up and down, have heretofore been employed, and also that ore-stamps have been lifted by a positive motion and permitted to fall by gravity, and do not herein claim such subject-matter; but

I claim—

1. The combination, with the tank of an ice-making apparatus, of a rock-shaft having tappet devices and independently-movable arms or agitators, whereby the shaft moves the agitators in one direction only, substantially as and for the purpose specified.

2. The combination of the shaft 1, yokes or saddles 2, and arms 3.

FREDK. N. MACKAY.

Witnesses:
W. B. JOHNSON,
W. M. EDWARDS.